LIST FINDER

Filed Sept. 21, 1948 4 Sheets-Sheet 1

INVENTOR
MARTIN S. POLLOCK,
BY Irving Seidman
ATTORNEY

LIST FINDER

Filed Sept. 21, 1948

4 Sheets-Sheet 2

INVENTOR
MARTIN S. POLLOCK,
BY Irving Seidman
ATTORNEY

April 24, 1951 M. S. POLLOCK 2,550,598

LIST FINDER

Filed Sept. 21, 1948 4 Sheets-Sheet 3

INVENTOR
MARTIN S. POLLOCK,
BY
Irving Seidman
ATTORNEY

April 24, 1951 M. S. POLLOCK 2,550,598

LIST FINDER

Filed Sept. 21, 1948 4 Sheets-Sheet 4

INVENTOR
MARTIN S. POLLOCK,
BY Irving Seidman
ATTORNEY

Patented Apr. 24, 1951 2,550,598

UNITED STATES PATENT OFFICE 2,550,598

LIST FINDER

Martin S. Pollock, New York, N. Y.

Application September 21, 1948, Serial No. 50,266

6 Claims. (Cl. 40—104)

This invention relates to a desk accessory of the selector type for listing telephone numbers upon indexed cards and has particular reference to such a device comprising a lower base member having a platform with a flexible extension thereon and to which base member there is pivotally attached at one end an overlapping card holding closure member adapted to swing about its pivotal connection to expose a selected card, the front ends of said indexed cards being formed with tabs carrying index indicia thereon which protrude in key board fashion beyond the front wall of the said card holding closure member, and a spring actuating means for urging the said card holding closure member to an open position.

An object of this invention is the provision in a device of the character described of a base member having a platform with a flexible portion projecting freely therefrom and a closure member pivotally attached to the said base member and adapted to house indexed recording cards, selectively separating said recording cards, and means for allowing the said closure member to open and carry an unselected number of the said recording cards within same.

Another object of this invention is the provision in a device of the character described including spring means for urging the said indexed recording cards upwardly into the said card holding closure member when the said card holding closure member is in its locked and closed position.

A further object of this invention is the provision in a device of the character described including means for depressing the said flexible extension to release the said closure member and means to limit the return upward movement of the said flexible extension.

A further object of this invention is the inclusion in a device of the character described of a key board arrangement of tabs upon the said recording cards, the said tabs having index indicia thereon.

Another object of this invention is the provision therein of a friction contact means adapted to hold all or some of the said recording cards within the said closure member.

A further object of this invention is the inclusion therein of means for selectively exposing a recording card when the tab of said card is depressed.

A still further object of this invention is the provision therein of spring snap latch for locking the said closure member to the said base member, means operable by depressing said flexible extension upon the said base member for releasing the said snap latch and spring means for urging the said closure member to open position when said snap latch is released.

Another object of this invention is the provision therein of a selector pawl attached to and pendent from said closure member which is adapted to engage a predetermined card when said cover member rises and a cam element attached to the said base member adapted to coact with said selector pawl to move same out of line with the cards when the said cover member is in its lowered and closed position.

A further object of this invention is the inclusion therein of an arcuate cupped shaped card holding element having a slot in its periphery to allow cards to be readily withdrawn or replaced and means for partially rotating said arcuate card holding member for the purpose of withdrawing or replacing cards.

A still further object of this invention is the provision therein of spring means for setting the arcuate card holding member in a fixed position.

A still further object of this invention is the inclusion therein of a flat spring member attached to the platform of the said base member and adapted to engage below the bottom card to lift the cards into normally raised position within the said cover member.

A still further object of this invention is the inclusion therein of a simple and novel means used for mounting the arcuate cupped shaped card holding member and connecting the said base and cover member.

A still further object of this invention is the provision of a device in which the constituent elements are so arranged structurally and functionally as to assure improved results with materials and members which may be manufactured at reasonable cost, may be easily assembled and which will be efficient in operation with minimum wear to the parts.

The invention possesses other objects and features of advantage, some of which, with the foregoing will be set forth in the following description and in the claims wherein parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 4:
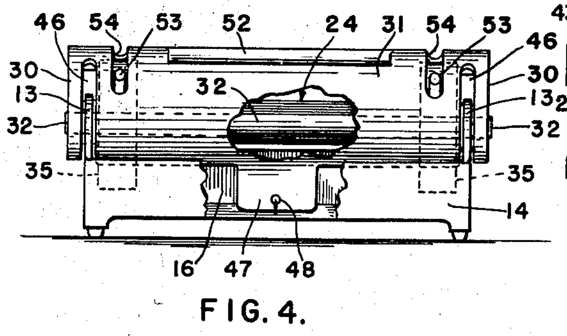
Fig. 4 is a rear elevational view showing parts broken away and the device closed.
Figures 4A, 4B:
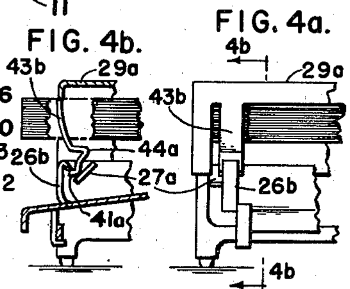

Fig. 4*a* is a fragmentary detail showing a modification which will be hereinafter described.

Fig. 4*b* is a sectional elevation of same taken along line 4*b*—4*b* of Fig. 4*a*.

Figure 1:
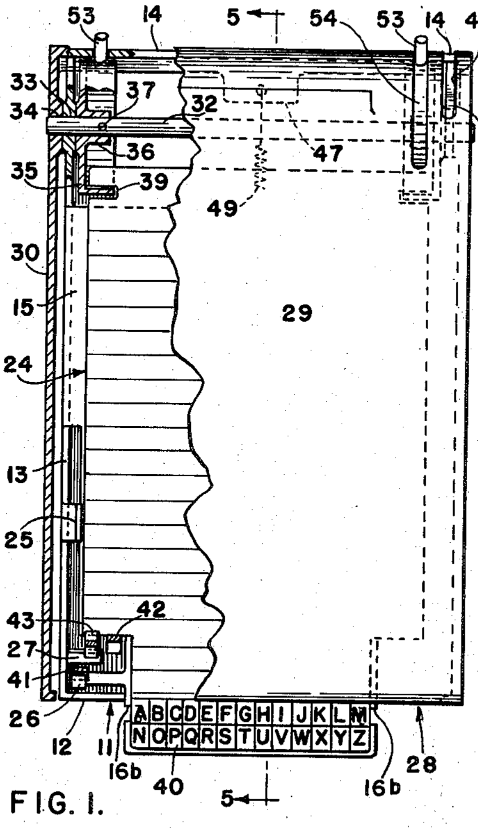
Fig. 1 is a top or plan view of the device in closed condition and shows the cover partly broken away and parts in section.
Figure 5:
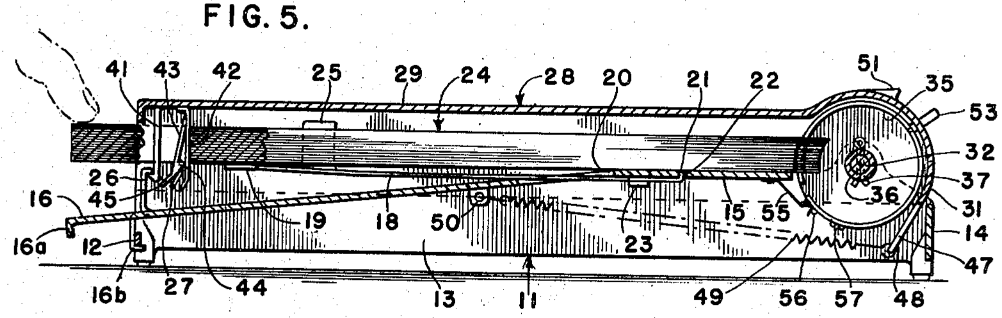

Fig. 5 is an enlarged sectional view taken along the line 5—5 of Fig. 1, looking in the direction indicated by the arrows and shows, in outline, a finger about to depress the flexible extension of the platform upon the base member.

Figure 6:
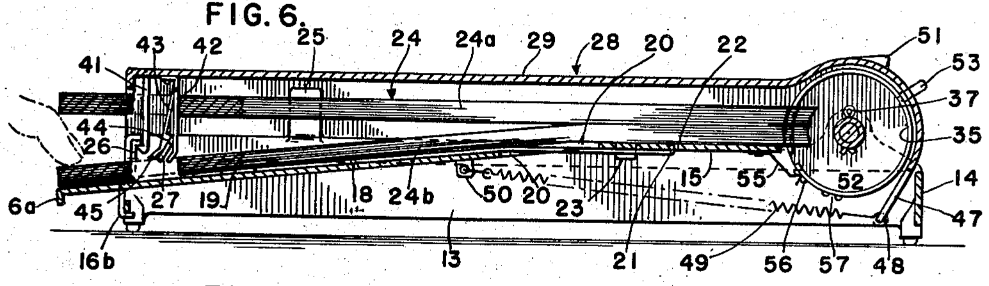

Fig. 6 is a similar section showing the flexible extension of the platform partly depressed and the device still closed.

Figure 7:
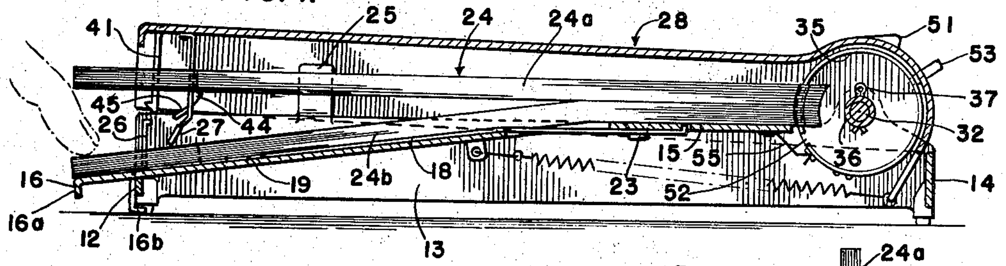

Fig. 7 is a similar sectional view showing the flexible extension of the platform fully depressed and the cover member released and about to rise to open position.

Figures 8, 9, 10:
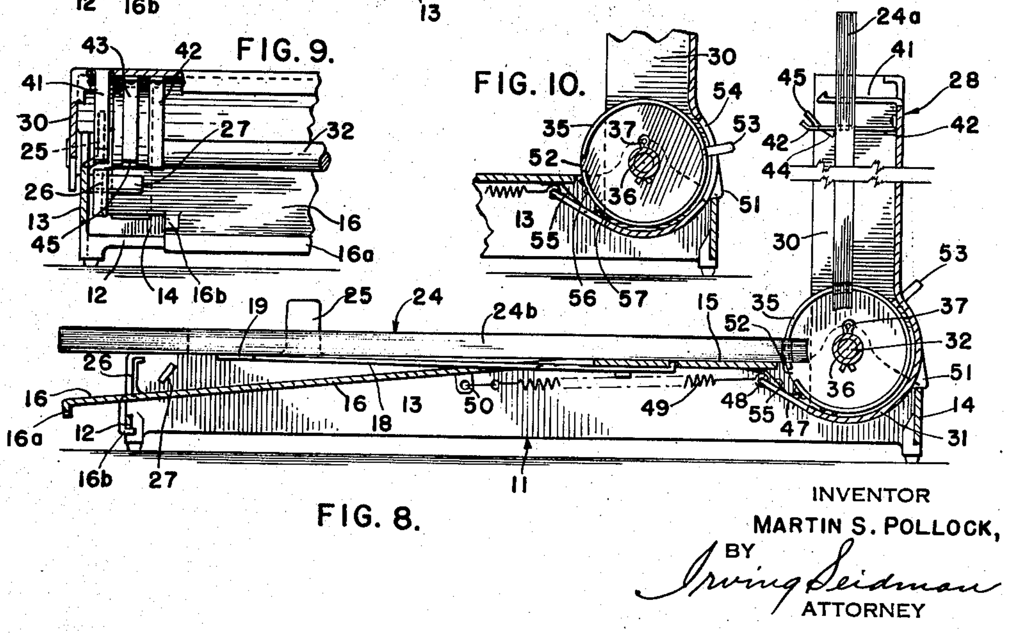

Fig. 8 is a sectional view showing the cover member fully raised and the device open exposing to view a selected card.

Fig. 9 is a partial front view having parts broken away.

Fig. 10 is a sectional elevational view of the hinged portion of the device is open position.

Figure 11:
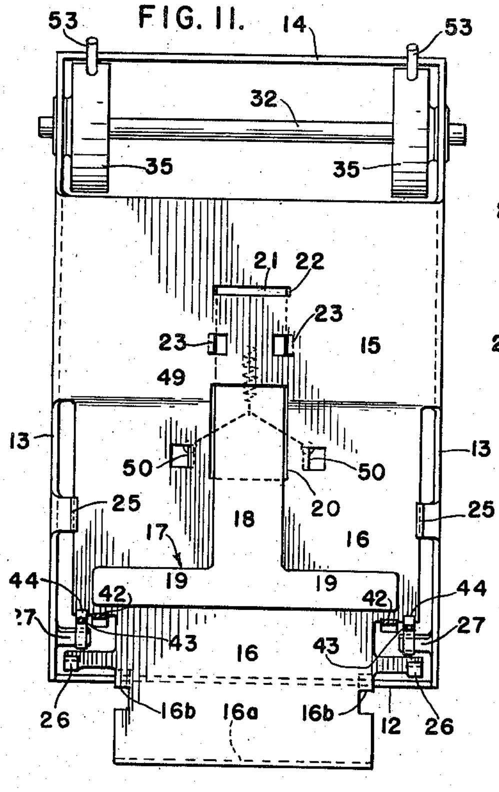

Fig. 11 is a plan view having the closure member detached and the cards removed.

Figure 12:
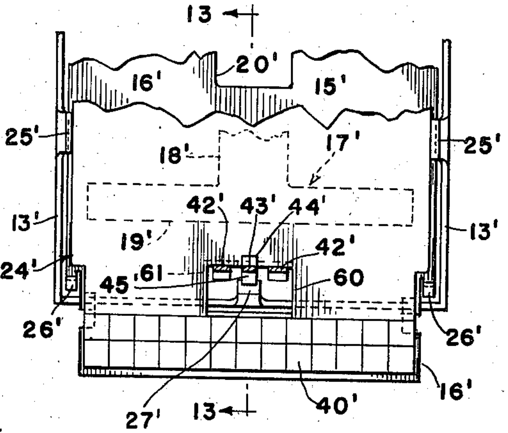

Fig. 12 is a plan view of the front portion of the device and shows a modified form which will be hereinafter described.

Figure 13:
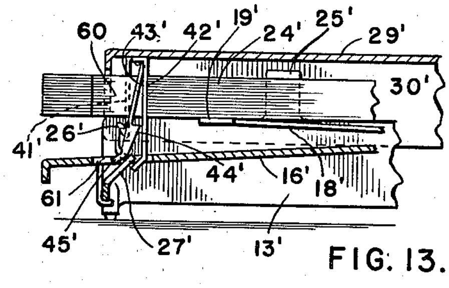

Fig. 13 is a sectional elevational view of Fig. 12 taken along the line 12—13 of said Fig. 12.

Figure 14:
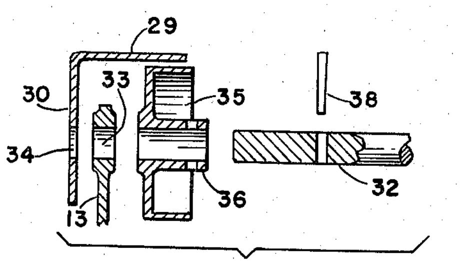

Fig. 14 is a detail view of the hinge and shows the parts drawn apart.

Figure 15:
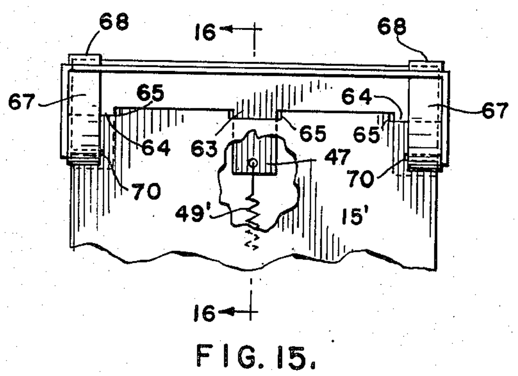

Fig. 15 is a plan view of the hinged section of a modified form.

Figure 16:
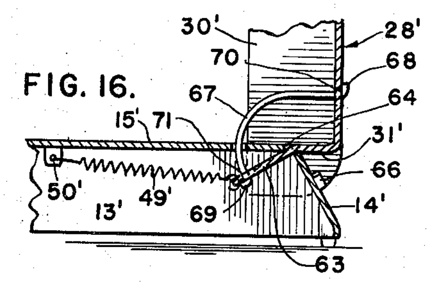

Fig. 16 is a section of same taken along line 16—16 of Fig. 15.

Figure 17:
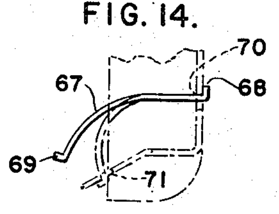

Fig. 17 is a detail of a part of said hinge.

Figure 18:
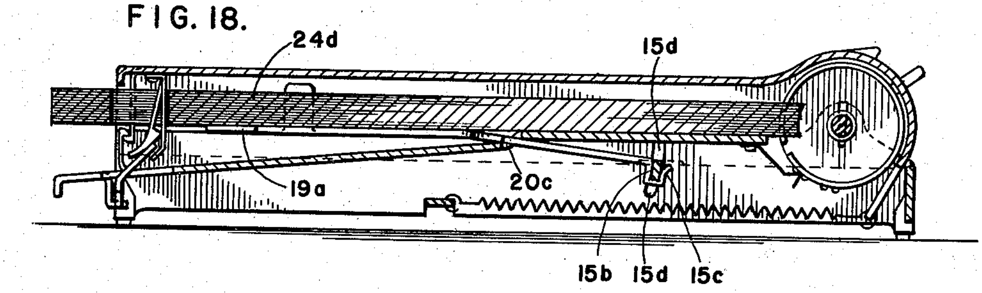

Fig. 18 is a sectional elevation showing a slight modification.

Figure 19:
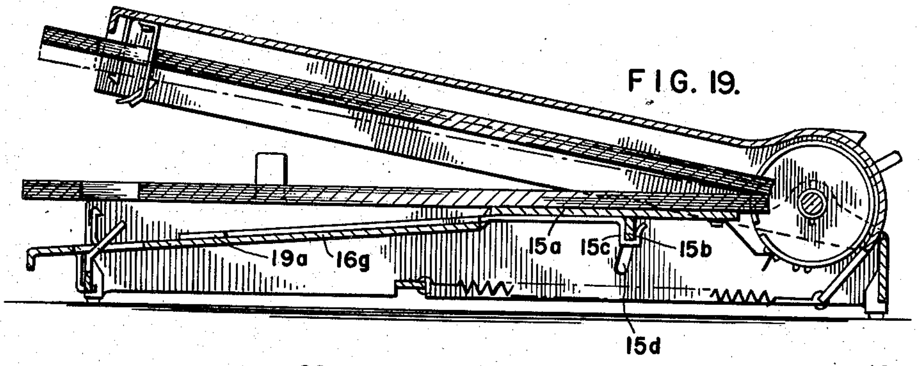

Fig. 19 is a similar elevation showing the device partly open.

Figures 20, 21, 22:
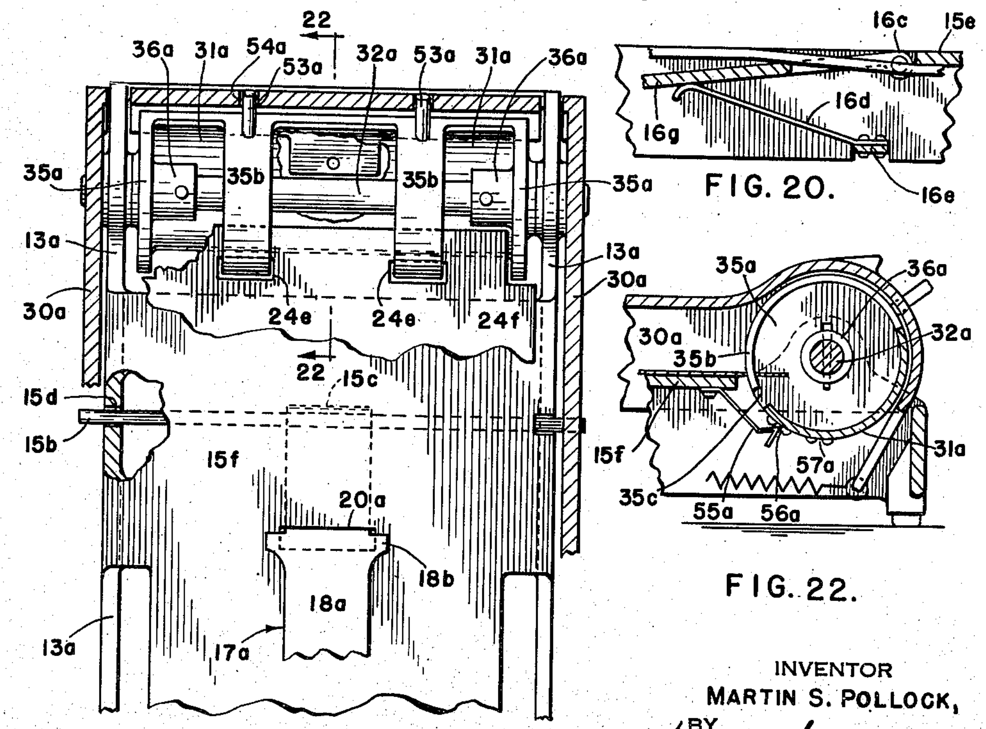

Fig. 20 is a detail sectional view of a modification.

Fig. 21 is a plan view of the rear portion of a base member with parts broken away and showing a portion of a closure member in section, and Fig. 22 is a partial section elevation taken along line 22—22 of Fig. 21.

Referring in detail to the parts, 11 designates a base member having a low front wall 12, side walls 13, rear wall 14 and a platform 15 integrally formed with and partially spanning the side walls 13. The platform 15 formed with a forwardly extending flexible portion 16 inclined downwardly from its point of attachment with the platform 15 to its foremost end. A T-shaped spring supporting member 17 (Fig. 11) is removably held upon the said platform 15 and comprises a leg 18 and laterally extending cross arms 19 forming the T-shaped member. The long leg 18 of said T-shaped member engages through a perforation 20 in the said platform 15 and its flexible extension 16 and has an upturned hook end 21 which engages through a perforation 22 in the said platform 15. Lugs 23 extend downwardly from the said platform 15 and form guides which engage the sides of the leg 18 to hold the said supporting member 17 in alinement.

Removably attached recording cards 24 are adapted to rest upon the said platform 15 and are held in perfect alinement thereon by means of frictional contact with upstanding guide lugs 25 which are integrally formed upon the sides 13 of the said base member 11. Flexible upstanding snap latch elements 26 extend laterally from the said flexible portion 16 of the platform 15 and are integrally formed thereon. The purpose of these snap latch elements will be hereinafter set forth. Cam members 27 project inwardly from the side 13 of the said base member 11 and will also be hereinafter further described.

A card holding closure member 28 having an open front, top 29, side walls 30 and an arcuate rear wall 31 is pivotally attached to the walls 13 of the aforesaid base member by a detachable shaft 32 engaging through bearings 33 in the side walls 13 of the said base member and through bearings 34 in the side walls 30 of the said card holding closure member (Figs. 1, 2, 4 and 14). Cup-shaped members 35 having hub formations 36 are slideable upon said shaft 32 but are permanently fixed thereon by means of a cotter pin 37 shown in various views, or by a tapered pin 38 shown in Fig. 14. The said cup shaped members 35 are adapted to receive the aforesaid cards 24 (Figs. 1 and 2) which are slotted at 39 to engage over the peripheral edge of said cupped members. The said cards are formed with forwardly protruding tabs 40 which carry index indicia as indicated upon Figs. 1 and 2.

Dependent from the top 29 of the said card holding cover 28 is a snap latch element 41 which is adapted to engage the aforesaid snap latch element 26 when the card holding closure member is lowered to closed position (Figs. 1, 5 and 6). In Fig. 1 the lower end of the dependent snap latch element 41 is shown in section and in engagement with the snap latch element 26. The said dependent snap latch element 41 and its complementary snap latch element 26 are flexible and readily separated when a pull is exerted upon the said latch element 26. Spring strips or bands 42 attached to and dependent from the said top 29 of the card holding cover member 28, make frictional contact with the edges of the aforesaid cards 24 and hold the cards in place within the said cover member 28. A downward pressure upon the cards however, will cause them to slide against the said bands 42 until they are free therefrom. A spring type selector strip and hook 43 also dependent from the top 29 of the said cover member 28 is formed with a finger or pawl 44 which is adapted to engage under a card and hold all the cards, above same, within the said card holding cover member 28 when the same is raised to open position. When the said cover member is down and in closed position the lower end 45 of the said selector pawl 44 acts as a cam follower and engages the aforesaid cam 26 upon the said base member and moves the said selector pawl out of engagement with the edges of said cards 24.

The arcuate rear wall 31 of the said cover member is slotted at 46 to provide passage for the side walls 13 when the said cover member is raised, and approximately at the center thereof, the said arcuate rear wall is formed with a tangentially extending lip 47 having an orifice 48 in which the end of a tension spring 49 is mounted. The opposite end of said spring engages a pair of lugs 50 formed upon the under side of said platform 15. The pressure of the said spring 49 pulls the said cover member 28 to its open position when same is released as shown in Fig. 8. A stop 51 is formed upon the arcuate rear wall and is adapted to engage against the upper edge of the rear wall 14 and thereby limit the movement of the said cover member (Fig. 8).

To facilitate the removal or placement of cards 24 the cupped member 35 may be formed with a slot 52 (Fig. 10) and to bring this slot in line with the upper surface of the platform 15 the said cupped member may be partially rotated by means of a pin 53 extending through a slot 54 in the arcuate rear wall 31. To properly fix the said cupped member 35 in position, there is provided a flat spring pawl 55 which engages in recesses 56 and 57 formed upon the said cupped member. When the cover member 28 is in its raised position, the cupped member 35 may be rotated to bring the slot 52 into its open position (Fig. 10) or it may be rotated in the opposite direction to bring the slot 52 to its closed position below the platform 15 (Fig. 8).

When the card carrying the index letter P is to be exposed to view, finger pressure is applied to the said card (Figs. 2 and 5) which with the cards below it, is forced downwardly until the bottom card rests upon the extension 16 of the platform 15. At this point it will be noted (Fig. 6) that the snap latch element 26 and the snap latch member 41 are still locked together and that the cam 27 which actuates the selector pawl 45 is holding the said selector pawl 44 out of engagement with the cards 24. The said cards 24 have, at this point, been divided into two parts namely an upper portion 24*a* which is held in place by contact with the friction bands 42 and a lower portion 24*b* which rests and is held upon the extension 16. The spring member 18 being at the same time depressed and disposed between the bottom card and the upper face of the extension 16. The finger pressure now further depresses the extension 16 and the cards 24*b* upon same, thereby disengaging the snap latch element 41 and the snap latch element 26 allowing the spring 49 to swing the cover member to its open position.

When the said snap latch elements 26 and 41 are unlocked and the said closure member moves up the cam follower 45 rides free of the cam 27 thereby allowing the selector pawl 44 to engage under the cards 24*a* and carry same upwardly within the closure member 28. When the pressure upon the lower cards 24*b* is released (Fig. 8) the flexible extension resumes its normal position and the cards upon it are forced upwardly by the action of the spring member 18 as shown.

In the embodiment so far described the snap latch members 26 and 41, the friction bands 42 and the selector pawl 44, its cam follower 45 and cam 27 are located at each side of the base and closure members. In the embodiment shown in Figs. 12 and 13 the snap latch members only are arranged at each side while the friction contact bands, selector pawl, cam follower and cam are arranged in the center. The cards being perforated at 60 and the flexible extension 16′ at 61.

A further modification is shown in Figs. 15, 16 and 17. In this embodiment a base member having sides 13′, platform 15′ and rear wall 14′ is shown. A closure member having side walls 30′ and a top 28′ is formed with a rear wall 31′ having a central tongue formation 63 and side tongue formations 64, which are adapted to extend through slots 65 formed at the intersection of the platform 15′ and the rear wall 14′. A spring 49′ provides the means for swinging the closure member upwardly and open. A stop 66 may be provided to limit the rearward movement of the closure member. Spring bands 67 having hooked ends 68 and 69 are snapped or sprung into the slots 70 in the closure member and the slots 71 in the end tongues 64. Fig. 17 shows the normal shape of the band 67 and the dot-dash line shows the same in operative position. The said bands 67 receive the slotted ends 39 of the recording cards 24.

Figure 2:
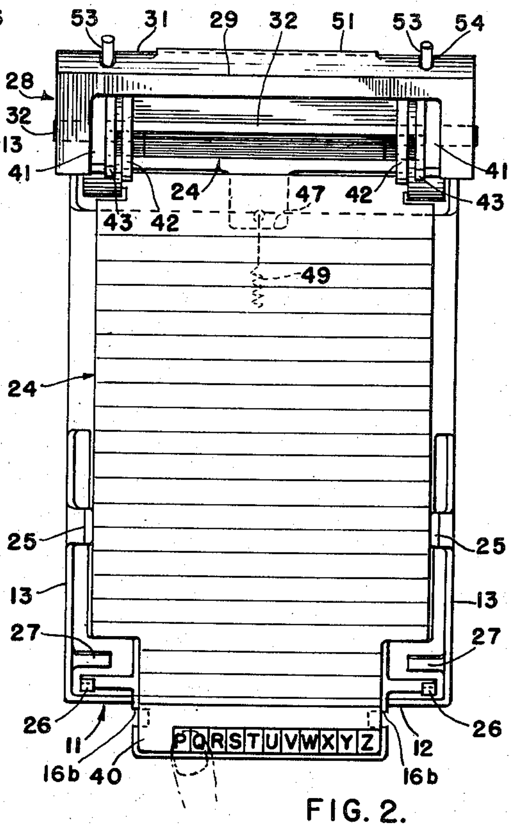
Fig. 2 is a similar view showing the cover raised and the device open.
Figure 3:
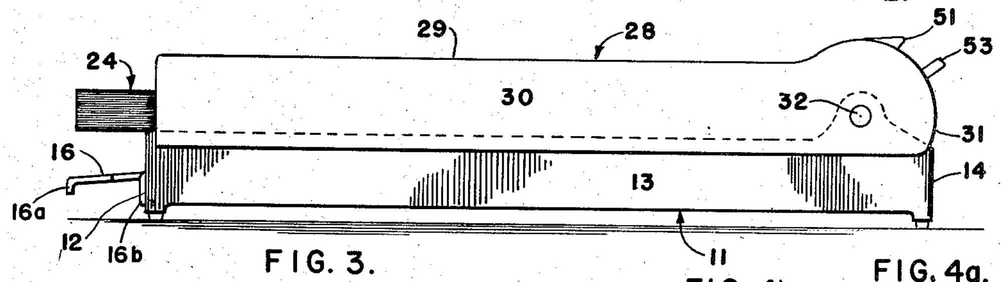
Fig. 3 is a side elevational view of same in closed condition and slightly enlarged.

The aforementioned tabs 40 as shown project forwardly in key board fashion and each tab carries indicia to indicate a letter of the alphabet as shown in Figs. 1 and 2.

To prevent the said flexible extension 16 from being distorted or twisted out of shape when depressed, there is formed thereon a flange 16*a* and to limit the upward movement of the said flexible extension 16, hook members 16*b* are formed thereon. The said hook members 16*b* engage under the front wall 12 of said base member.

A modified form of the spring member 18, heretofore described, is shown in Figs. 18, 19 and 21. In this latter form the spring member has a leg portion 18*a* the end of which passes through an orifice 20*a* in the platform 15*a* and engages at its end, a cross rod 15*b*. The end of the spring member leg 18*a* being formed to fit snugly around the said cross bar 15*b* as shown at 15*c* (Figs. 18 and 19). This said cross bar 15*b* is adapted to move in slots 15*d* upon the side walls 13 of the said base member 11 and extends outwardly beyond the said wall to engage the under side of the side walls 30 of the said closure member. The leg portion 18*a* of this spring 17*a* is formed with shoulders 18*b* which act as a fulcrum about which the spring 18*a* springs.

As the closure member moves downwardly to its closed position, shown in Fig. 18, the lower edges of the side walls 30 of the said closure member contacts the outwardly extending ends of the cross-bar 15*b* (Figs. 18, 19 and 21) to force same down and move the arms 19*a* upwardly against the said recording cards 24. This movement presses the said recording cards into the said closure member. When the said closure member is raised to its open position the pressure upon the said cross bar 15*b* is removed and the cross bar rises to the position shown in Fig. 19 and the arms 19*a* drop to rest upon the flexible extension 16*a* of the platform 15*a*.

In place of the flexible extension 16 and 16*a* as hereinbefore described and shown, there may be provided a rigid extension member 16*b*, hinged to the platform 15*e* at 16*c* (Fig. 20). To normally urge the said flexible extension upwardly there is provided a flat spring 16*d* secured at one end to a supporting 16*e*.

Fig. 21 shows a hinging unit comprising shaft 32*a*, the ends of which engage in bearings upon the side walls 13*a* of the base member and in the side walls 30*a* of the closure member and through hubs 36*a* formed upon end disks 35*a* which are integrally connected by an arcuate cross wall 31a. The said arcuate wall 31a is formed with arcuate finger members 35b which are adapted to engage through perforations 24e in cards 24f to hold same upon the platform 15f. Pins 53a, moving in slots 54a, are attached to the said finger members 35b and afford a means for partially rotating the said fingers to bring a slot or opening 35c in position above the platform 15f to facilitate card removals or replacements. Spring pawls 55a, engaging in recesses 56a and 57a, are provided to properly set the position of said opening.

The modified form illustrated in Figs. 4a and 4b shows a card engaging pawl 44a and a snap latch 41a combined as a single unit, the pawl 44a being formed by cutting out and bending down a section of the closure member 29a while the snap latch element 26b is formed by cutting out and extending upwardly a portion of the flexible extension of the base member.

I claim:

1. In a selector device of the character described, the combination of a base member comprising side and rear walls, a low front wall, a fixed platform integrally formed upon and partially spanning the side walls and having a freely forwardly extending flexible and depressible portion, the front end of which extends slightly beyond the front wall of the base member, a closure member pivotally and removably attached to the base member, a tension spring disposed between the base member and closure member to urge same upwardly about its pivotal connection, flexible upstanding snap latch elements extending from and formed upon the free end of the flexible extension of the fixed platform, a depending flexible snap latch element integrally formed upon the closure member and, coacting with the snap latch element upon the flexible extension, locks and holds the closure member in closed position, recording cards upon the fixed platform and movable with the closure member, cup shaped card holding members having inwardly extending arcuate side walls thereon, a removable shaft pivotally holding the base member, closure member and cupped card holding members in place, removable pins engaging through hubs upon the cupped card holding members, indexed tabs formed upon the recording cards and extending, in keyboard formation, forwardly therefrom and aligned with the front end of the flexible extension of the fixed platform, each tab, when depressed, being adapted to separate the cards into an upper and lower stack, the upper stack of cards remaining within and moving with the closure member when same is released by the coacting snap latches, while the lower stack of cards comprising a card selected by depressing a tab, and its underlying cards is held depressed against the flexible extension of the fixed platform, upstanding spring guide lugs integrally formed upon the base member and frictionally engaging against the side edges of the recording cards, depending spring bands secured at one end to the closure member and frictionally engaging the front edges of the cards, the said upstanding guide lugs and depending spring bands adapted to hold the stack of cards in the closure member while a selected card and its underlying cards are held depressed against the flexible extension of the platform.

2. In a selector device of the character described and as set forth in claim 1, including a flat T spring element removably secured to the fixed base member and extending forward and under the lowermost recording card to urge same upwardly.

3. In a selector device of the character described and as set forth in claim 1, including a spring type selector hook depending from and attached to the closure member and employed as a locking means to securely hold the upper stack of recording cards within the closure member and a cam upon the base member engaging a pawl formation upon the selector hook to disengage same when the closure member is in closed position.

4. In a selector device of the character described and as set forth in claim 1, wherein the arcuate walls of the cup shaped card holding members are formed with slots to facilitate the placement or removal of cards and a finger hold comprising a pin, upon the arcuate walls of the cupped card holding members, extending through a slot in the closure member to rotate the cupped card holder to bring the slots in the arcuate walls into alignment for the placement or removal of cards.

5. In a selector device of the character described and set forth in claim 1, including a stop means upon the closure member engaging the rear wall of the base member to limit the pivotal movement of the closure member.

6. In a selector device of the character described and as set forth in claim 1, including a strap upon the flexible extension of the fixed platform engageable with the front wall of the base member to limit the upward movement of the flexible extension.

MARTIN S. POLLOCK.

REFERENCES CITED

The following references are of record in the file of this patent:

UNITED STATES PATENTS

| Number | Name | Date |
|---|---|---|
| 1,895,409 | Drucker | Jan. 24, 1933 |
| 2,115,537 | Peter | Apr. 26, 1938 |
| 2,141,761 | Pollock | Dec. 27, 1938 |
| 2,223,966 | Peters et al. | Dec. 3, 1940 |
| 2,341,983 | Faas | Feb. 15, 1944 |